Dec. 20, 1966   F. S. WHITE   3,293,330
FLUIDIZED PROCESS FOR CALCINING PARTICULATE LIMESTONE
Filed Dec. 21, 1962
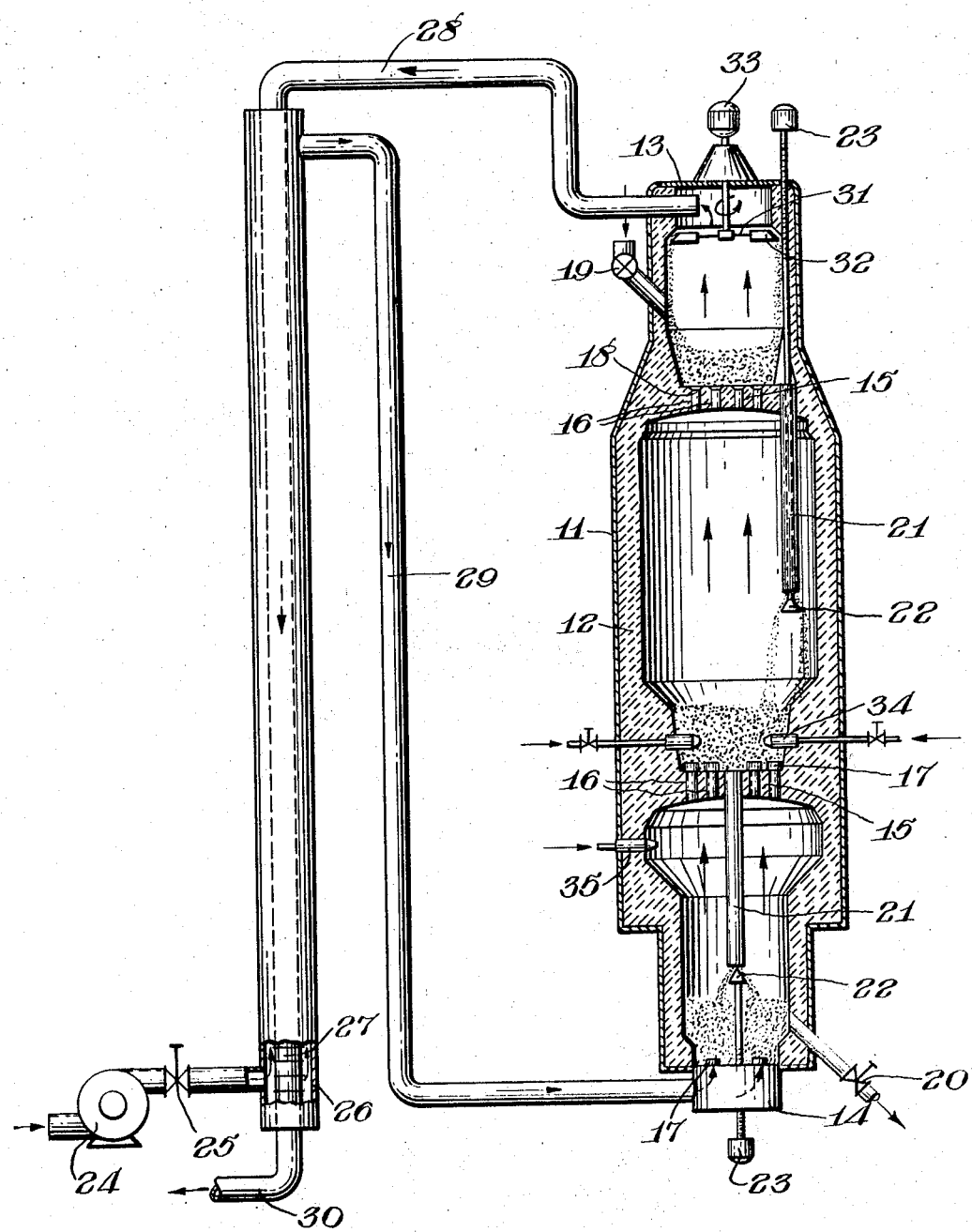
INVENTOR
FRANK S. WHITE
BY Connolly and Hutz
ATTORNEYS

3,293,330
FLUIDIZED PROCESS FOR CALCINING PARTICULATE LIMESTONE

Frank S. White, Apple Valley, Calif., assignor to Chas. Pfizer & Co., Inc., a corporation of California
Filed Dec. 21, 1962, Ser. No. 246,493
1 Claim. (Cl. 263—53)

This invention is concerned with fluidized-solids processing, and more particularly with an improved, continuous process for contacting particulate solids with a countercurrent gas stream in a fluidized bed at elevated temperature.

It is an object of the present invention to reduce attrition and improve recovery of process solids in an open-circuit, fluidized-solids reactor.

Another object is to provide an improved method of heat recuperation in such a process.

A further object is to simplify fluidized-bed processing, with reduction in solids-retention time and power requirements.

Another object is to provide a fluidized calcining process characterized by reduced vulnerability to power failure.

Still a further object is to provide quicklime of improved slaking qualities and higher calcium oxide content.

These and other advantages are realized in accordance with my invention by recycling a portion of the entrained dust in the exhaust gases emerging from a fluidized-bed process and by preheating the gas supply to such a process, as more fully described hereinafter.

The new process can perhaps best be illustrated in its application to the calcining of limestone. Considerable success has been achieved in recent years in this field employing multiple-bed, fluidized-solids reactors. High quality products have been made with excellent fuel economy in furnaces of five stages, of which the uppermost three have been devoted to countercurrent extraction of the sensible heat of the combustion gas, using it to preheat the incoming solids fed to the calcining stage. The five-compartment design has, however, certain undesirable characteristics:

First, these reactors are extremely vulnerable to power or mechanical failures, usually requiring a period of three to six days to resume operations after such failure.

Second, as a result of the prolonged fluidization of the incoming feed in the preheating stages, high dust losses are sustained due to abrasion of the process solids.

Third, in the calcining of limestone, significant recarbonation of the quicklime product occurs in the fifth or cooling stage, by reabsorption of carbon dioxide evolved from partly calcined particles of stone continuously entering the cooler from the fourth or calcining stage. This recarbonation is quite detrimental to quicklime: it not only reduces the available calcium oxide content but, more important, alters the slaking properties of the quicklime, causing the lime milks and putties to be coarse and grainy.

I have solved these difficulties with an improved three-stage process employing external countercurrent heat recuperation, thus enabling the heat in the exhaust gases to be returned to the furnace via the incoming air, instead of requiring that it all be returned in preheated solids. The improved process also utilizes solids classification in the single preheater to separate the entrained dust into two fractions, returning the coarser fraction to the furnace. This fraction represents a salvage of material values, and also acts as a cushioning agent to decrease the rate of attrition of material in process. In addition, the shorter hold-up time in the single-stage fluidized preheater, in contrast to three-stage fluidized heat recuperation, similarly contributes to reduction of attrition losses. These solutions to the problem have been achieved without significant decrease in the inherently good fuel economy of the fluidized calcining process.

In FIG. 1 is shown a vertical view, partly in section, of a furnace, consisting of a cylindrical steel shell 11 lined with suitable refractory 12. The furnace is closed at the top with an insulated steel cover 13 and at the bottom with an insulated windbox 14. The furnace is divided into three fluidized-bed compartments by two refractory hearths 15. The hearths are pierced with a plurality of holes 16, which are capped with alloy steel inserts, suitably of the conventional multiple-hole, non-sifting bubble-cap type 17, or the single orifice type 18 more fully illustrated in my U.S. Patent 2,548,642.

Means are provided for introducing feed under pressure via feed lock 19, and for discharging product via discharge valve 20. Transfer of materials between stages is suitably effected by means of transfer pipes 21 with flow-regulating cone valves 22 actuated by positioners 23.

Compressed air is furnished by blower 24, regulated by valve 25. The air is caused to flow upward through the heat exchangers 26, passing on the outside of the finned tubular members 27. Exhaust gases and dust from the furnace are led via duct 28 through the inside of the finned tubular members 27, resulting in a countercurrent heat exchange whereby the sensible heat of the exhaust gases and dust is employed to heat the incoming air to the furnace, thereby salvaging the heat in a simple and efficient manner. The preheated air from the exchangers is led to the windbox of the furnace via duct 29. The exhaust gases and dust are directed to conventional dust collection equipment, not shown, via duct 30.

Means are provided for classifying the dust ejected from the top bed of the furnace with a dust classifier such as the well known "Whizzer" device, consisting of a horizontal spinning disk 31 of alloy steel (e.g. type 310 stainless) to which are fixed a plurality of flat vertical blades 32. The disk is caused to spin by a variable-speed drive motor 33.

Oil, or other fuel for combustion, suitably regulated, is injected directly into the central fluidized bed via burners 34. As a means of starting the furnace, auxiliary fuel is burned directly in the lower chamber, utilizing auxiliary burner 35. While gas or coal may be employed as fuel, oil will generally be preferred.

Operation of the improved process

To place the furnace in operation, the air compressor is started and a regulated flow of air is introduced into the furnace. The auxiliary burner is then started for preheating and the classifier disk is set to spinning. After a suitable period of preheat, limestone or other feed, preferably crushed to pass $3/16''$ and dedusted of extreme fines such as those passing 150 mesh, is introduced into the top compartment through the feed lock. The upward-flowing current of hot air fluidizes the material, i.e. it suspends the particles and renders them mobile, so that the particulate mass takes on the properties of a fluid, exhibiting hydrostatic head, assuming a level, and being confined by the circular walls of the vessel.

When a suitable level of material is reached in the top compartment, e.g. 8–16 inches, the top control valve is opened and a flow of material started to the central, calcining compartment, where further heating takes place. When a level of 18–24 inches of fluidized material is reached in the calciner and the temperature of the fluidized mass is safely above the ignition point of the fuel, a flow of fuel is injected through the main burners and the auxiliary heating is discontinued.

The injected fuel burns directly on the surface of the fluidized particles. Because of the large amount of surface of these particles relative to the rate of heat release, the heat is almost wholly absorbed by the fluidized mass, causing the temperature to rise. In the case of limestone, calcination begins at about 1400° F. with evolution of carbon dioxide.

As calcination proceeds the temperature rises more slowly until, at 1600° F., the fluidized mass is essentially all converted to calcium oxide, whereupon the temperature rises rapidly. When a temperature sufficient to impart the desired physical properties to the material is reached, the range being 1750–2000° F. in the case of lime, the flow of feed is regulated to the top or preheat compartment, thence to the center or calcining compartment, to stabilize the temperature at the desired level. This regulation is suitably effected for the preheat chamber by a level controller and for the calcining chamber by a temperature controller.

As further amounts of material are calcined, the fluidized bed level rises in the calciner. When the desired operating level is reached, usually 24–28 inches, an automatic level controller causes the lower cone valve to open, allowing calcined material to flow to the bottom compartment for cooling. Here the incoming preheated air cools the lime to a temperature lower than that in the calciner but higher than that of the preheated air. Lime thus cooled is discharged from the furnace via valve 20 as finished product.

As stable conditions are approached, the speed of the dust classifier is adjusted to impart the desired rotary motion to the rising gases and entrained particles in the preheater, so that the coarsest particles of the entrained dust are thrown to the walls of the vessel, where they slide down the walls and return to the bed. Particles too fine to be disengaged are carried through the spinning rotor by the upward rising current of gases and enter duct 28, which projects a short distance into the furnace, away from the walls where the coarser particles being disengaged are concentrated. As the speed of the classifier is increased, the added centrifugal force progressively disengages finer and finer particles. The very finest, however, are allowed to escape, in order to prevent building up undesirable circulating loads between the succeeding stages of the furnace. Such circulating loads, if excessive, are detrimental to the fuel economy of the furnace.

*Experimental operating results*

A pilot furnace of 5'3" internal calciner diameter embodying the aforementioned improvements was built and placed in experimental operation. The test results obtained confirm that I have solved the problems described and have made major improvements in the art of calcining limestone. These improvements are such that they have merit in the general field of fluidized processing. Pertinent experimental results are summarized briefly below.

First, in the matter of obtaining flexibility to be able to surmount mechanical or power failures with minimum loss of production time: The furnace was shut down to descale the orifices in the preheater furnace, which is a periodic requirement of all fluidized lime calcining furnaces. After cooling, the orifices were descaled and other repairs made as necessary. Operation was then immediately resumed without preheating. Automatic control and production of line was secured in 43 minutes after start-up. Similarly, power failures, both real and simulated, have been overcome with delays of less than an hour after the power was restored. This is in striking contrast to the experience with conventional five-stage calciners, where periods of days are required to resume operation, as previously discussed.

Second, in the matter of dust losses: A series of tests was conducted employing shallow minimum detention beds, 8" in the preheater, 24" in the calciner, and 12" in the cooling stage. During the tests all conditions were held as nearly constant as possible except for the rotational speed of the classifying device, which was varied to change the fineness of the dust escaping from the furnace. The results are summarized in Table 1.

TABLE 1.—EFFECT OF CLASSIFIER SPEED

| Classifier Speed, r.p.m. | 130 | 145 | 175 | 190 |
|---|---|---|---|---|
| Bed Temperatures, ° F.: | | | | |
| Top Compartment | 1,318 | 1,342 | 1,380 | 1,440 |
| Middle Compartment | 1,896 | 1,884 | 1,903 | 1,895 |
| Bottom Compartment | 1,179 | 1,189 | 1,197 | 1,230 |
| Preheated Air to Kiln, ° F. | 941 | 935 | 946 | 991 |
| Oil Consumed, gal./ton | 37.1 | 38.1 | 39.7 | 39.8 |
| Oil Consumed, corrected for radiation losses | 33 | 32 | 33 | 34 |
| Production rate, tons/day | 12.30 | 11.92 | 11.68 | 11.48 |
| Product, percent passing 100 mesh [1] | 1.1 | 1.3 | 2.7 | 2.7 |
| Dust, percent passing 100 mesh [1] | 97.4 | 99.5 | 99.7 | 99.7 |
| Product recovery, percent | 80.5 | 85.7 | 83.8 | 80.0 |
| Product recovery, percent, corrected for 100 mesh fines in feed | 84 | 90 | 86 | 84 |

[1] Tyler sieve scale.

From the data, it is seen that as the classifier speed is increased, increasing amounts of fines appear in the finished produce and finer dust is emitted from the kiln. Further, by comparing the percentage recovery results with the fines content of the product, it is seen that recovery is increased by a substantially greater amount than that predicted from the sieve analyses, thus indicating that the formation of new fines by attrition is reduced as the recirculated dust increasingly cushions the violently agitated (fluidized) particles.

It will be further noted from inspection of the data that an optimum rate of dust recycle can be achieved, beyond which the advantages realized are progressively reduced. Excessive recirculation of fines will rob the calciner of heat, causing the temperature in the top compartment to rise, thereby increasing fuel consumption and reducing capacity. The increased solids detention time resulting from the decreased capacity also tends to increase attrition, and the results decline from the optimum. Thus, it is necessary to classify the emerging dust, permitting the finer fraction to escape. Since formidable problems are entailed in measuring the actual proportion of dust being recycled in a reactor, it is best to provide adjustable means for controlling the degree of recycle, enabling the optimum conditions to be readily established by experiment. Furthermore, the optimum value will vary with the other process conditions, and particularly with the grade and hardness of the limestone or other solids being processed. With California limestone, recycle of dust coarser than 100–150 mesh has provided excellent results, but with other raw materials the optimum may lie outside this range.

It is desirable in processing solids by fluidization to pretreat them by prior drying and classification to remove the extreme fines or flour produced in crushing the raw material. Such equipment has not been available to me in my experimental work, but the data can be approached by adding the percentage of undesirable fines in the feed, normally the minus 100 mesh fraction, to the actual recoveries shown. Doing this, it is seen that the process I have developed provides a recovery of 90%, which is commercially highly advantageous.

Third, in the matter of product quality, I have discovered that it is possible with the new gas-to-air heat recuperation feature to establish equilibrium conditions of temperature in the cooling stage of the furnace in the range of 1150–1225° F. or higher. At these temperatures the dissociation pressure of carbon dioxide from calcium carbonate ranges from 3.75 mm. Hg to 8.2 mm. Hg. Since these values are greater than the partial pressure of carbon dioxide in the atmosphere, the absorption of carbon dioxide from the process air is wholly prevented. Quite unexpectedly, I have also observed that the equilibrium pressures so established allow any partially calcined particles transferring from the calcining stage to "auto-calcine" essentially to completion. The carbon dioxide liberated from the auto-calcination at the equilibrium conditions is unable to recombine with the fluidized lime being processed in the cooler.

I have found that this phenomenon provides a product of high calcium oxide availability, 96–97%, which closely approaches the maximum permitted by the raw material analysis. In addition, the product slakes with water to a smooth stiff putty with less than 1%+100 mesh grain content. Similarly, the plasticities of the putties are uniformly high, ranging from 400 to 450 Plasticity Index, compared with the values of 150–300 usually obtained in the conventional five-stage process, as measured on the Emley plasticimeter. This quality is of particular importance where the lime is employed in the construction trades.

In further tests, the operation of the new process has been compared with that of the prior five-stage process, employing the same grade of limestone in each case. Results are summarized in Table 2.

TABLE 2.—THREE- VS. FIVE-STAGE CALCINING

|  | Commercial Five-Stage Kilns | | Pilot Three-Stage Kiln | | |
| --- | --- | --- | --- | --- | --- |
|  | A | B | 145 r.p.m.[1] | 190 r.p.m.[1] | Overall Average |
| Dust, tons/100 ton product | 30 | 21 | 10.8 | 7.2 | 8.4 |
| Fuel Consumed, gal./ton product | 33 | 29 |  |  | 33 |
| Power Consumed, kw.-hr./ton product | 30 | 30 |  |  | 20 |

[1] Classifier speed.

It will be noted that striking reductions in dust losses and power consumption are afforded by the new process, without significant loss in thermal efficiency. Allowing for radiation losses, which are disproportionately high in a small diameter furnace (16% in the described pilot unit as compared to 2–3% in one of four times the diameter), the results obtained indicate that final ratios of 30 gallons No. 6 oil per ton of product can be achieved in a large reactor properly insulated. In addition, the 10 kilowatt-hr. power saving per ton of product, afforded by the reduced pressure requirements of a three- vs. a five-stage process, represent a saving equivalent to approximately two gallons of fuel oil at currently prevailing costs.

The described improvements in lime quality are achieved when the product is discharged from the fluidized zone at a temperature of at least about 1100° F., and preferably at least 1150° F., whereas prior art processes provide for discharge at about 650–750° F. The carbon dioxide contents of the lime produced under these two sets of conditions are typically within the ranges 0.00–0.10% and 0.5–1.0%, respectively. Of course, reabsorption of small amounts of carbon dioxide from the atmosphere may proceed at a reduced rate after the hot lime is discharged from the turbulent zone. However, experience has amply demonstrated that such subsequent recarbonation after total calcination is not detrimental, and may sometimes even be beneficial. On the other hand, recarbonation occurring in the kiln, for reasons which are not fully understood, unquestionably has a substantially harmful effect. The primary criterion for obtaining optimum product is a minimum discharge temperature of 1150° F.; however, in the interest of fuel economy, it is further preferred that this temperature not exceed about 1250° F.

As discussed, the desirable discharge temperatures are conveniently achieved by preheating of the inlet air, preferably by heat recuperation from the exhaust gases for greater fuel economy. This may be termed "indirect" heat recuperation to indicate that the heat is transferred through a conducting barrier such as a metal duct, and not by direct mixing of the exhaust gases with the inlet air. It is obvious that the inlet air can alternatively be heated by heat exchangers fired by a separate heat source, but this will entail higher fuel consumption and is therefore less desirable. Still another means for achieving the specified product discharge temperatures is by oxygen enrichment of the inlet air, which permits proportionately higher fuel combustion and leads directly to a higher equilibrium temperature in the lower, cooling zone.

While the desirable solids-recycle control is provided in the specific embodiment I have described by a Raymond "whizzer" disc, other known pneumatic classifiers operating on the centrifugal principle may readily be substituted. One such equivalent is the Federal type of classifier which operates on the principle of a cyclone collector with an air bleed counterposed to the gas stream entering the cyclone, thus in effect deliberately destroying the solids separation efficiency and thereby providing classification. Other centrifugal means for classification are shown in standard engineering handbooks and will readily occur to those skilled in the art.

The foregoing discussion of the new process features has been illustrated by reference to the calcining of lime, but these features have substantially broader application in the field of "open-circuit" fluidized-solids processing. By an open-circuit process I mean one in which the solids emerging from the bottom of the reactor represent a product which is not returned, as distinguished from those processes in which the solid is a catalyst which is continuously retained within the process. Other fluidized-bed applications which benefit from recycle of a cushioning proportion of the entrained solids in the exhaust gases, and gas-to-air heat recuperation, include the various oxidation, reduction and partial or complete calcining operations, such as the calcining of phosphate rock and the roasting of ores, as well as the drying of coal and other solids. In each of these, losses due to dust formation are reduced by the cushioning effect and by the decreased retention time provided by elimination of solids-preheating stages. In addition, substitution of gas-to-air for gas-to-solids heat recuperation simplifies operation and hence reduces vulnerability to power failure; it also offers power savings by decreasing air compression requirements, while still providing the necessary fuel economy.

Clearly, the solids classification and gas-to-air heat recuperation features each make valuable contributions. Entrained dust classification may be applied to fluidized-bed reactors of any number of stages, including five, with substantial benefit, and the same is true of gas-to-air heat recuperation. Nevertheless, the greater advantages are realized when the two are employed together. Thus, the recycled solids more readily penetrate the fewer stages made possible by external heat recuperation, and classification is more beneficial under these conditions. Similarly, minimum dust formation is experienced when the cushioning effect of recycled solids operates concurrently with the substitution of gas-to-air for gas-to-solids heat recuperation.

What I claim is:

An improved continuous process for calcining fluidizable particulate limestone consisting of particles substantially all of which are coarser than 100 mesh, which comprises the steps of passing said limestone countercurrent to a flow of air through a series of fluidized beds successively comprising a preheating bed, a heated calcining bed and a cooling bed, centrifugally classifying by internal adjustable means the solids entrained in the exhaust gases emerging from said preheating bed into a relatively coarse fraction and a relatively fine fraction, recycling to said preheating bed the relatively coarse fraction, permitting the relatively fine fraction to escape in said exhaust gases, passing said hot exhaust gases depleted of said coarse fraction countercurrent to and in indirect heat transfer relationship with the cool air flowing to said cooling bed, and discharging the calcined lime product from said cooling bed at a temperature between about 1100° and 1250° F.

References Cited by the Examiner

UNITED STATES PATENTS

| | | | |
|---|---|---|---|
| 2,086,201 | 7/1937 | Zeisberg | 75—9 |
| 2,498,710 | 2/1950 | Roetheli | 263—53 |
| 2,567,959 | 9/1951 | Munday | 23—1 |
| 2,634,119 | 4/1953 | Ruiz | 263—53 |
| 2,650,084 | 8/1953 | White | 263—53 |
| 2,665,971 | 1/1954 | Lewis et al. | 23—1 |
| 2,670,193 | 2/1954 | Pyzel | 23—1 |
| 2,671,102 | 3/1954 | Jewell | 23—1 |
| 2,684,840 | 7/1954 | Behme et al. | 263—53 |
| 2,763,599 | 9/1956 | Abeel et al. | 23—1 |
| 2,874,950 | 2/1959 | Pyzel | 263—53 |

OTHER REFERENCES

Lenhart and Rockwood, "New and Revolutionary Methods of Lime Manufacture," Rock Products, January 1948, pages 113–116.

FREDERICK L. MATTESON, JR., *Primary Examiner.*

TOBIAS E. LEVOW, *Examiner.*

S. E. MOTT, *Assistant Examiner.*